P. ZIMMERMAN.
Machine for Flaring and Crimping Lamp-Chimneys.
No. 8,716. Reissued May 13, 1879.
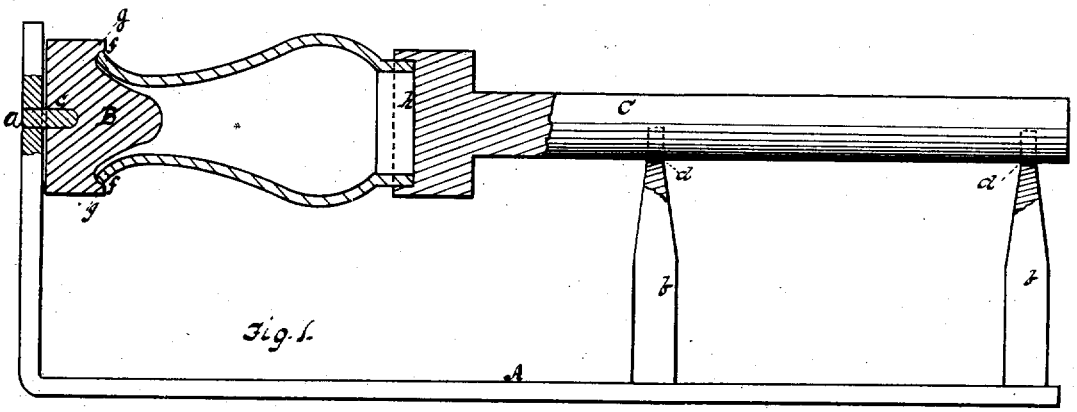
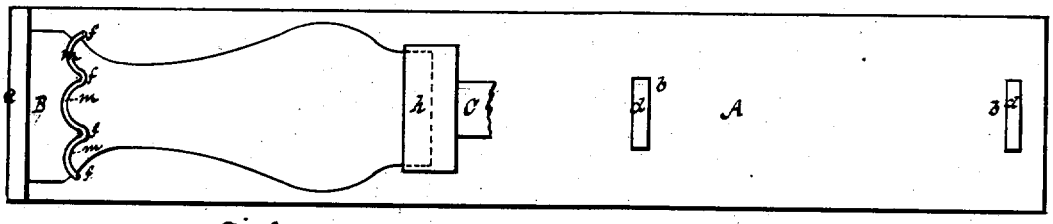
Fig. 2.
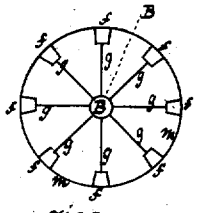
Fig. 3.
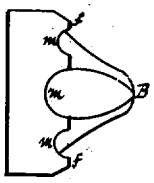
Fig. 4.
Witnesses.
Alex. Scott
William Paxton
Inventor.
Paul Zimmerman
by Bakewell & Kerr
Attys
N. PETERS, PHOTO-LITHOGRAPHER, WASHINGTON, D. C.

UNITED STATES PATENT OFFICE.

PAUL ZIMMERMAN, OF PITTSBURG, PENNSYLVANIA.

IMPROVEMENT IN MACHINES FOR FLARING AND CRIMPING LAMP-CHIMNEYS.

Specification forming part of Letters Patent No. 170,616, dated November 30, 1875; Reissue No. 8,716, dated May 13, 1879; application filed April 23, 1879.

*To all whom it may concern:*

Be it known that I, PAUL ZIMMERMAN, of Pittsburg, in the county of Allegheny and State of Pennsylvania, have invented a new and useful Improvement in Machines for Flaring and Crimping Lamp-Chimneys; and I do hereby declare the following to be a full, clear, and exact description thereof, reference being had to the accompanying drawings, forming part of this specification, in which—

Figure 1 is a side view, partly in section and partly in elevation, of my improved flaring and crimping guide or machine. Fig. 2 is a plan view of the same, with a part of the handle of the snap or tool to which the lamp-chimney is attached removed. Fig. 3 is a front view of the corrugated cone which flares and crimps the lamp-chimney or other tubular article of glassware. Fig. 4 is a side view of the part shown in Fig. 3.

My invention relates to the construction of devices for crimping or flaring and crimping open-ended glassware; and it consists, first, in the combination of a centering-rest with a tool having a series of radial ribs, said tool arranged in axial line with the rest, so that an article may be rapidly and regularly centered and fluted or crimped; and, secondly, in combining with a centering-rest a tapering-tool, terminating in radial ribs, said tool arranged in axial line with the rest, and adapted to both flare and crimp an open-ended article of glassware with rapidity and symmetrically.

In the accompanying drawings I have shown my invention as constructed for flaring and crimping lamp-chimneys; but in practice the application will not be confined to such articles, as smoke-bells, shades, and any other article of glassware which requires to be flared and crimped or scalloped after it has been previously molded, or produced in any manner without being flared and crimped in the first process, may be operated upon.

A in the drawings represents a frame, with an end bearing, *a*, and upright guides *b b*. The bearing *a* is provided with a pivot, *c*, and the guides *b b* are constructed with half-round notches *d d* in their upper ends. To the pivot *c* a fluted cone, B, is fastened, and upon the guides *b b* a "snap" or tool, C, is placed, so that its stem fits snugly in the half-round notches *d d*, as shown.

The cone is peculiar in having the divisions *f f*, between its scallops *m m*, extended up above the base of the cone, as shown in Fig. 1, and with a narrow space, *g*, between the circumference of the cone and their inner sides.

By this construction portions of the end of the lamp-chimney or other article being flared and crimped have a chance to enter between the cone and the stops, while other portions are allowed to spread out into the scallops around the base of the cone, and by this means the spreading of the glass article beyond a determined extent on any side of its center is prevented without interfering with the proper flaring and scalloping or crimping of the same.

The snap or tool C is constructed with a socket, *h*, in its head, into which the base of the glass chimney or other article is fitted snugly, and it, with the chimney attached, is moved toward the cone in the semicircular notches *d d* of the guides *b b*, and as it moves it is steadied by the guides and kept truly in center with the axis of the cone.

The cone may be placed on a vertical axis or horizontal base-support, and the guides *b b* may be set at right angles to the axis of the cone, under which construction the snap or tool would be moved vertically instead of horizontally in the semicircular notches *d d*.

I do not claim as my invention the stops and scallops at the base of the cone; or a tapered coniform plug or former for flaring and shaping open-ended glassware. Neither do I claim the fluting or crimping open-ended glassware by reheating the end of the article and pressing it over a tapered or coniform former having radially-projecting edges; but

What I claim, and desire to secure by Letters Patent, is—

1. The combination, in a machine for fluting or crimping open-ended glassware, of a centering-rest and a crimping-tool in axial line therewith, substantially as and for the purpose specified.

2. The combination of a centering-rest with a tapering tool, terminating in radial ribs arranged in axial line with the rest and adapted to both flare and crimp an open-ended article of glassware, substantially as and for the purpose specified.

In witness whereof I, the said PAUL ZIMMERMAN, have hereunto set my hand.

PAUL ZIMMERMANN.

Witnesses:
JAMES H. PORTE,
T. B. KERR.